United States Patent
Remezov et al.

(10) Patent No.: US 12,079,379 B2
(45) Date of Patent: Sep. 3, 2024

(54) PERIPHERAL COMPONENT INTERCONNECT EXPRESS PROTECTION CONTROLLER

(71) Applicant: HUAWEI TECHNOLOGIES CO., LTD., Guangdong (CN)

(72) Inventors: Denis Remezov, Waterloo (CA); Yin Tan, Waterloo (CA); Jingshun Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 165 days.

(21) Appl. No.: 17/111,007

(22) Filed: Dec. 3, 2020

(65) Prior Publication Data
US 2022/0180009 A1    Jun. 9, 2022

(51) Int. Cl.
| | |
|---|---|
| G06F 21/85 | (2013.01) |
| G06F 12/10 | (2016.01) |
| G06F 12/14 | (2006.01) |
| G06F 13/28 | (2006.01) |
| G06F 13/40 | (2006.01) |

(Continued)

(52) U.S. Cl.
CPC .............. *G06F 21/85* (2013.01); *G06F 12/10* (2013.01); *G06F 12/14* (2013.01); *G06F 13/28* (2013.01); *G06F 13/4027* (2013.01); *G06F 13/4282* (2013.01); *G06F 21/44* (2013.01);
(Continued)

(58) Field of Classification Search
None
See application file for complete search history.

(56) References Cited

U.S. PATENT DOCUMENTS 7,950,020 B2 *   5/2011   Sun ..................... G06F 9/45558
                                                            713/100
9,864,701 B1 *   1/2018   Khan .................. G06F 12/0292
(Continued)

FOREIGN PATENT DOCUMENTS

| CN | 104052621 A | 9/2014 |
| CN | 108027642 A | 5/2018 |
| CN | 111541658 A | 8/2020 |

OTHER PUBLICATIONS

International Search Report and Written Opinion of PCT/CN2021/130596; Dong, Libo; Feb. 15, 2022.
(Continued)

*Primary Examiner* — Henry Tsai
*Assistant Examiner* — Christopher A Bartels
(74) *Attorney, Agent, or Firm* — Gregg Jansen (57) ABSTRACT

The disclosed systems, structures, and methods are directed to a computer system including a PCIe protection controller as a part of a PCIe root complex that includes at least one root port. Each root port is configured to optionally connect to at least one endpoint device, and each endpoint device is designated as a secure endpoint device or a nonsecure endpoint device. The PCIe protection controller is configured to control outbound traffic to protect secure endpoint devices from access from any nonsecure components of the computer system. The PCIe protection controller may be further configured to control inbound traffic to prevent access to secure memory by nonsecure endpoint devices. The PCIe protection controller may be dynamically configured at runtime to designate endpoint devices as either secure or nonsecure.

19 Claims, 5 Drawing Sheets

(51) Int. Cl.
  *G06F 13/42* (2006.01)
  *G06F 21/44* (2013.01)
(52) U.S. Cl.
  CPC .............. *G06F 2212/1052* (2013.01); *G06F 2213/0026* (2013.01)

(56) References Cited

U.S. PATENT DOCUMENTS

| | | | |
|---|---|---|---|
| 10,055,357 B2* | 8/2018 | Vidyadhara | G06F 13/28 |
| 10,638,311 B2* | 4/2020 | Li | G06F 21/53 |
| 10,693,641 B2* | 6/2020 | Adams | H04L 9/0894 |
| 11,531,760 B1* | 12/2022 | Righi | G06F 21/85 |
| 11,687,645 B2* | 6/2023 | Chen | G06F 21/44 726/22 |
| 2007/0118743 A1 | 5/2007 | Thornton et al. | |
| 2008/0092145 A1* | 4/2008 | Sun | G06F 9/45558 719/312 |
| 2014/0122820 A1* | 5/2014 | Park | G06F 12/145 711/163 |
| 2015/0032910 A1 | 1/2015 | Ben Yehuda et al. | |
| 2015/0199010 A1* | 7/2015 | Coleman | G16H 40/67 345/156 |
| 2015/0237058 A1 | 8/2015 | Chritz et al. | |
| 2016/0007083 A1* | 1/2016 | Gurha | H04N 21/25808 725/13 |
| 2016/0235324 A1* | 8/2016 | Mershin | A61B 5/6803 |
| 2017/0115987 A1* | 4/2017 | Peixoto Machado Da Silva | G11C 29/028 |
| 2017/0185345 A1* | 6/2017 | Lim | G06F 21/10 |
| 2018/0054732 A1* | 2/2018 | Li | H04W 12/02 |
| 2018/0121381 A1* | 5/2018 | Podsiadlo | G06F 13/404 |
| 2018/0275990 A1* | 9/2018 | Peixoto Machado Da Silva | G06F 13/4282 |
| 2019/0113973 A1* | 4/2019 | Coleman | H04L 12/16 |
| 2019/0273754 A1* | 9/2019 | Ting | G06F 9/50 |
| 2019/0303342 A1* | 10/2019 | Jen | G06F 13/364 |
| 2020/0089645 A1 | 3/2020 | Benjamini et al. | |
| 2020/0250302 A1* | 8/2020 | Chen | G06N 20/00 |
| 2022/0180009 A1* | 6/2022 | Remezov | G06F 21/85 |
| 2023/0289229 A1* | 9/2023 | Kakaiya | G06F 21/74 |

OTHER PUBLICATIONS

PCI Express® Base Specification, Revision 3.0, Nov. 10, 2010.
PCI Express® Device Security Enhancements (Draft), Version 0.71, Sep. 2018, Intel.
Arm Security Technology, Building a Secure System using TrustZone® Technology, 2005-2009 Arm Limited, PRD29-GENC-009492C.
Arm System Memory Management Unit Architecture Specification—SMMU architecture versions 3.0, 3.1 and 3.2, 2016-2018 Arm Limited.
PrimeCell® TrustZone Protection Controller (BP147), Version 9.1.0, 2017, Arm Limited.
TrustZone® Address Space Controller (TZC-380)—Revision: r0p0, 2008, 2010, Arm Limited.
Arm CoreLink™ TZC-400 TrustZone® Address Space Controller—Revision: r0p1, 2013-2015, Arm.
TrustZone for Armv8-A, Version 1.0, 2019, Arm Limited.

* cited by examiner

PERIPHERAL COMPONENT INTERCONNECT EXPRESS PROTECTION CONTROLLER

CROSS-REFERENCE TO RELATED APPLICATIONS

This is the first filing related to the disclosed technology. At the time of filing, there are no related patents or applications.

FIELD OF THE INVENTION

The present disclosure relates generally to the field of hardware-based systems isolation and trusted computing, and more particularly to systems and methods for Peripheral Component Interconnect Express (PCIe) endpoint device security isolation.

BACKGROUND

The concept of a trusted execution environment (TEE) is widely used for supporting hardware-based systems isolation and trusted computing in security engineering. For example, on the ARM architecture, the ARM TrustZone® technology provides the building blocks for the construction of TEEs, though it will be understood that similar concepts apply to a variety of architectures and TEE technologies.

ARM TrustZone® includes a number of security extensions across various hardware components, including the central processing unit (CPU), the system bus, caches, system memory management units (SMMUs), and others. These serve to partition a machine's execution environment into two parts: a so-called "normal" world, and a "secure" world. The normal world represents a rich execution environment (REE), and includes user, supervisor, and (optionally) hypervisor layers. Ordinary applications (generally a majority of applications) execute within a REE.

The secure world represents a TEE that includes a trusted operating system and trusted user applications. The TEE may optionally include a virtualization stack. Compared to REE, a TEE typically includes a limited set of applications, supporting security-related operations.

In the above scheme, TEE applications receive strong, hardware-based protection in terms of integrity and confidentiality against REE software components (including privileged layers). Additional isolation between different secure applications within a single TEE can be provided by process control mechanisms.

In addition to securing software application code and data through the mechanism described above, TrustZone® (as well as various other TEE technologies) supports secure hardware I/O. This is achieved by making the corresponding hardware components aware of TrustZone® and isolating those components from nonsecure system components, including nonsecure hardware and all REE software. Secure I/O enables features such as, for example, secure user interfaces in ARM-based mobile devices.

Unlike mobile devices, desktop and server devices currently use PCIe as their most prevalent expansion bus standard. PCIe serves as the system interface for a broad spectrum of devices, including devices whose input and/or output may include a user's sensitive data. For example, in high-performance machine learning applications, graphics processing units (GPUs) and neural processing units (NPUs) may perform complex programmable computational tasks on user data, which may require data integrity and protection of confidentiality. Accordingly, it would be desirable to extend the secure I/O capabilities of a TEE such as TrustZone® to PCIe-based peripheral devices.

There have been previous attempts to address this issue. For example, PCIe Device Security Enhancements is a draft of proposed PCIe extensions designed to provide PCIe device firmware measurement, device authentication and device-host link encryption. Unfortunately, these extensions would only apply to future devices that chose to support this potential standard, and could not be used with existing PCIe endpoint devices. Additionally, the encryption feature of the proposed extensions may incur noticeable performance costs in highly performance-sensitive applications such as accelerator cards. More fundamentally, the security model of these extensions does not address the possibility of a malicious or compromised REE supervisor or hypervisor. In particular, these extensions offer no solution against privileged REE software conducting a man-in-the-middle attack by snooping the system bus.

As another example of previous attempts to address security issues in PCIe-based peripheral devices, security settings of a peripheral device can be defined statically at design time. Security enforcement may then be carried out by the bridge device that connects the secure peripheral device to the main system bus. In the context of securing PCIe, the host/PCIe bridge in the root complex would be such a bridge device. No part of the PCIe tree would then be accessible from an REE, which would be inflexible from a system resource utilization point of view.

Another attempted solution, particular to the ARM TrustZone® technology, is the ARM TrustZone® Protection Controller (TZPC), which allows configuring peripheral hardware devices as secure or nonsecure. Configuration can be performed at runtime from a TEE. However, TZPC is limited to devices connected to an APB bus, which is a different and much simpler interface than PCIe. The very basic partitioning control offered by TZPC was not designed to support the complex programming model of PCIe.

In addition, ARM has published specifications for two versions of TrustZone® Address Space Controller (TZASC) devices. A TZASC filters system bus accesses from various masters to dynamic random-access memory (DRAM) based on security settings of selected DRAM regions, thereby providing security partitioning. The security settings are runtime-programmable from a TEE. However, a DRAM is a passive device, whereas PCIe endpoint devices are capable of performing bus mastering and memory write access. TZASC only supports such passive devices. The PCIe programming model is substantially different from and more complex than that of DRAM. TZAS is, by design, limited to linear, range-addressable devices such as random-access memory (RAM).

SUMMARY

The present disclosure provides systems and methods for PCIe endpoint device security isolation. The disclosed technology protects a configurable subset of PCIe endpoint devices designated as secure from nonsecure hardware and software system components, and maintains existing isolation of secure system components from nonsecure PCIe endpoint devices. Endpoint devices within PCIe domains are assigned into two groups: secure and nonsecure. This concept is referred to as security partitioning.

Secure PCIe endpoint devices are given several additional capabilities over nonsecure endpoint devices. In particular, secure endpoint devices are allowed write access (subject to ordinary address translation and access control by an SMMU) to secure physical memory ranges. Secure endpoint devices are also protected against I/O access from nonsecure requesters—both CPUs executing in "normal world" mode and peripheral hardware devices. Protection against normal world CPUs effectively implies protection against access from all REE software components. These protection mechanism may be supported by TrustZone® security extensions.

In addition, security partitioning is performed from within a TEE, and, therefore, is controlled by a trusted subject. Security partitioning is runtime-dynamic, meaning that a particular endpoint device can be reassigned to the secure or nonsecure group repeatedly under trusted application software control.

In accordance with one aspect of the present disclosure, the technology is implemented as a computer system including: a central processing unit; a memory device having secure memory; a PCIe root complex that includes at least one root port and a PCIe protection controller; a system interconnect connecting the central processing unit, the memory device, and the PCIe root complex; and a system memory management unit configured to translate addresses for direct memory access (DMA) requests from the at least one endpoint device before the requests are passed into the system interconnect. Each root port is configured to optionally connect to at least one endpoint device, and each endpoint device is designated as a secure endpoint device or a nonsecure endpoint device. The PCIe protection controller is configured to control outbound traffic to protect secure endpoint devices from access from any nonsecure components of the computer system.

In some implementations, the PCIe protection controller is configured to control outbound traffic to protect secure endpoint devices by allowing a request from a secure component of the computer system. The PCIe protection controller also allows the request from a nonsecure component of the computer system if a destination of the request is a nonsecure endpoint device. The PCIe protection controller reports the request to an access violation handler if the request is not allowed.

In some implementations, the PCIe protection controller is configured to use information from the system interconnect to determine that the request originates from a secure component of the computer system.

In some implementations, the PCIe protection controller includes an address lookup table that stores address ranges for memory-mapped regions of each secure endpoint device. The PCIe protection controller is configured to use information from the address lookup table to determine if a destination of the request is a nonsecure endpoint device.

In some implementations, the access violation handler is configured to trigger an exception for a request that is not allowed. The access violation handler may also or alternatively be configured to ignore a write request that is not allowed. The access violation handler may also or alternatively be configured to return a predetermined value for a read request that is not allowed. In some implementations, the PCIe protection controller is configured to dynamically set an access violation policy of the access violation handler unit.

In some implementations, the PCIe protection controller is configured to control inbound traffic to prevent access to secure memory by nonsecure endpoint devices by determining whether an originator of an incoming request is a secure endpoint device. The PCIe protection controller translates the incoming request to a secure StreamID and forwards the secure StreamID to the system memory management unit if the originator of the incoming request is a secure endpoint device. If the originator of the incoming request is a nonsecure endpoint device, the PCIe protection controller translates the incoming request to a nonsecure StreamID and forwards the nonsecure StreamID to the system memory management unit.

In some implementations, the PCIe protection controller further includes an EP_ID lookup table that stores an endpoint device identity for each secure endpoint device. In some implementations, the PCIe protection controller is configured to determine whether the originator of an incoming request is a secure endpoint device based, at least in part, on information from the EP_ID lookup table. In some implementations, the endpoint device identity may be based, at least in part, on bus, device, and function numbers of the endpoint device. The endpoint device identity may also be based on a physical port index. In some implementations, the bus, device, and function numbers are encoded in a requester ID value, and wherein the endpoint device identity is computed using bitwise operations to combine the requester ID value with the physical port index.

In some implementations, the PCIe protection controller is dynamically configurable at runtime to designate an endpoint device as a secure endpoint device or as a nonsecure endpoint device. In some implementations, the PCIe protection controller is further configured to query a security configuration of at least one endpoint device. In some implementations, the PCIe protection controller comprises a register space that is memory-mapped to a secure address space, and wherein the PCIe protection controller is dynamically configurable at runtime by accessing the register space.

In another aspect the technology may be implemented as a method of controlling outbound data traffic from a computer system to a PCIe endpoint device. The method includes: designating dynamically at runtime the PCIe endpoint device as a secure endpoint device or as a nonsecure endpoint device; determining whether an outbound request originates from a secure component of the computer system or from a nonsecure component of the computer system; forwarding the outbound request to the PCIe endpoint device if the outbound request originates from a secure component of the computer system; forwarding the outbound request to the PCIe endpoint device if the outbound request originates from a nonsecure component of the computer system and the PCIe endpoint device is designated as a nonsecure endpoint device; and reporting the outbound request to an access violation handler if the outbound request originates from a nonsecure component of the computer system and the PCIe endpoint device is designated as a secure endpoint device.

In a further aspect, the technology of the disclosure may be implemented as a method of controlling inbound data traffic from a PCIe endpoint device to a computer system. The method includes: designating dynamically at runtime the PCIe endpoint device as a secure endpoint device or as a nonsecure endpoint device; determining whether an originator of an incoming request is a secure endpoint device or a nonsecure endpoint device; translating the incoming request to a secure StreamID and forwarding the secure StreamID to a system memory management unit if the originator of the incoming request is a secure endpoint device; and translating the incoming request to a nonsecure StreamID and forwarding the nonsecure StreamID to the system memory management unit if the originator of the incoming request is a nonsecure endpoint device.

BRIEF DESCRIPTION OF THE FIGURES

The features and advantages of the present disclosure will become apparent from the following detailed description, taken in combination with the appended drawings, in which.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

Various representative embodiments of the disclosed technology will be described more fully hereinafter with reference to the accompanying drawings. The present technology may, however, be embodied in many different forms and should not be construed as limited to the representative embodiments set forth herein. In the drawings, the sizes and relative sizes of layers and regions may be exaggerated for clarity. Like numerals refer to like elements throughout.

It will be understood that, although the terms first, second, third, etc. may be used herein to describe various elements, these elements should not be limited by these terms. These terms are used to distinguish one element from another. Thus, a first element discussed below could be termed a second element without departing from the teachings of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. By contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). Additionally, it will be understood that elements may be "coupled" or "connected" mechanically, electrically, communicatively, wirelessly, optically, and so on, depending on the type and nature of the elements that are being coupled or connected.

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The functions of the various elements shown in the figures, including any functional block labeled as a "processor," may be provided through the use of dedicated hardware as well as hardware capable of executing instructions, in association with appropriate software instructions. When provided by a processor, the functions may be provided by a single dedicated processor, by a single shared processor, or by a plurality of individual processors, some of which may be shared. In some implementations of the present technology, the processor may be a general-purpose processor, such as a CPU or a processor dedicated to a specific purpose, such as a digital signal processor (DSP). Moreover, explicit use of the term a "processor" should not be construed to refer exclusively to hardware capable of executing software, and may implicitly include, without limitation, an application-specific integrated circuit (ASIC), a field-programmable gate array (FPGA), a read-only memory (ROM) for storing software, a random-access memory (RAM), and non-volatile storage. Other hardware, conventional and/or custom, may also be included.

Software modules, or simply modules or units which are implied to be software, may be represented herein as any combination of flowchart elements or other elements indicating the performance of process steps and/or textual description. Such modules may be executed by hardware that is expressly or implicitly shown. Moreover, it should be understood that a module may include, for example, but without limitation, computer program logic, computer program instructions, software, stack, firmware, hardware circuitry, or a combination thereof, which provides the required capabilities. It will further be understood that a "module" generally defines a logical grouping or organization of related software code or other elements as discussed above, associated with a defined function. Thus, one of ordinary skill in the relevant arts will understand that particular code or elements that are described as being part of a "module" may be placed in other modules in some implementations, depending on the logical organization of the software code or other elements, and that such modifications are within the scope of the disclosure as defined by the claims.

It should also be noted that as used herein, the term "optimize" means to improve. It is not used to convey that the technology produces the objectively "best" solution, but rather that an improved solution is produced. In the context of memory access, it typically means that the efficiency or speed of memory access may be improved.

As used herein, the term "determine" generally means to make a direct or indirect calculation, computation, decision, finding, measurement, or detection. In some cases, such a determination may be approximate. Thus, determining a value indicates that the value or an approximation of the value is directly or indirectly calculated, computed, decided upon, found, measured, detected, etc. If an item is "predetermined" it is determined at any time prior to the instant at which it is indicated to be "predetermined."

The present technology may be implemented as a system, a method, and/or a computer program product. The computer program product may include a computer-readable storage medium (or media) storing computer-readable program instructions that, when executed by a processor, cause the processor to carry out aspects of the disclosed technology. The computer-readable storage medium may be, for example, an electronic storage device, a magnetic storage device, an optical storage device, an electromagnetic storage device, a semiconductor storage device, or any suitable combination of these. A non-exhaustive list of more specific examples of the computer-readable storage medium includes: a portable computer disk, a hard disk, a random-access memory (RAM), a read-only memory (ROM), a flash memory, an optical disk, a memory stick, a floppy disk, a mechanically or visually encoded medium (e.g., a punch card or bar code), and/or any combination of these. A computer-readable storage medium, as used herein, is to be construed as being a non-transitory computer-readable medium. It is not to be construed as being a transitory signal, such as radio waves or other freely propagating electromagnetic waves, electromagnetic waves propagating through a waveguide or other transmission media (e.g., light pulses passing through a fiber-optic cable), or electrical signals transmitted through a wire.

It will be understood that computer-readable program instructions can be downloaded to respective computing or processing devices from a computer-readable storage medium or to an external computer or external storage device via a network, for example, the Internet, a local area network, a wide area network and/or a wireless network. A network interface in each computing/processing device may receive computer-readable program instructions via the network and forwards the computer-readable program instructions for storage in a computer-readable storage medium within the respective computing or processing device. Computer-readable program instructions for carrying out operations of the present disclosure may be assembler instructions, machine instructions, firmware instructions, configuration data for integrated circuitry, or either source code or object code written in any combination of one or more programming languages.

All statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable program instructions. These computer-readable program instructions may be provided to a processor or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowcharts, flow diagrams, state transition diagrams, pseudo-code, and the like.

The computer-readable program instructions may also be loaded onto a computer, other programmable data processing apparatus or other devices to cause a series of operational steps to be performed on the computer, other programmable apparatus or other devices to produce a computer-implemented process, such that the instructions which execute on the computer, other programmable apparatus, or other device implement the functions/acts specified in the flowcharts, flow diagrams, state transition diagrams, pseudo-code, and the like.

In some alternative implementations, the functions noted in flowcharts, flow diagrams, state transition diagrams, pseudo-code, and the like may occur out of the order noted in the figures. For example, two blocks shown in succession in a flowchart may, in fact, be executed substantially concurrently, or the blocks may sometimes be executed in the reverse order, depending upon the functionality involved. It will also be noted that each of the functions noted in the figures, and combinations of such functions can be implemented by special-purpose hardware-based systems that perform the specified functions or acts or by combinations of special-purpose hardware and computer instructions.

With these fundamentals in place, we will now consider some non-limiting examples to illustrate various implementations of aspects of the present disclosure.

In accordance with the disclosed technology, an architecture for a new hardware component, a PCIe protection controller (PCIPC), is introduced. In terms of hardware design, the PCIPC is located within a PCIe root complex. It will be understood that although the PCIPC is described below in the context of an ARM-based system that implements the ARM TrustZone® technology, the PCIPC of the present disclosure could be used with other system and security architectures. It will also be understood that PCIe is a well-known technology, the details of which are within the knowledge of one of ordinary skill in the art. A full description of version 3.0 of PCIe (still the most commonly used version at the time of writing, despite versions 4.0 and 5.0 having been released) is available in PCI-SIG, PCI Express® Base Specification Revision 3.0, Nov. 10, 2010. The ARM Architecture and TrustZone® are also well-known technologies, promulgated by Arm Ltd., of Cambridge, England.

Figure 1:
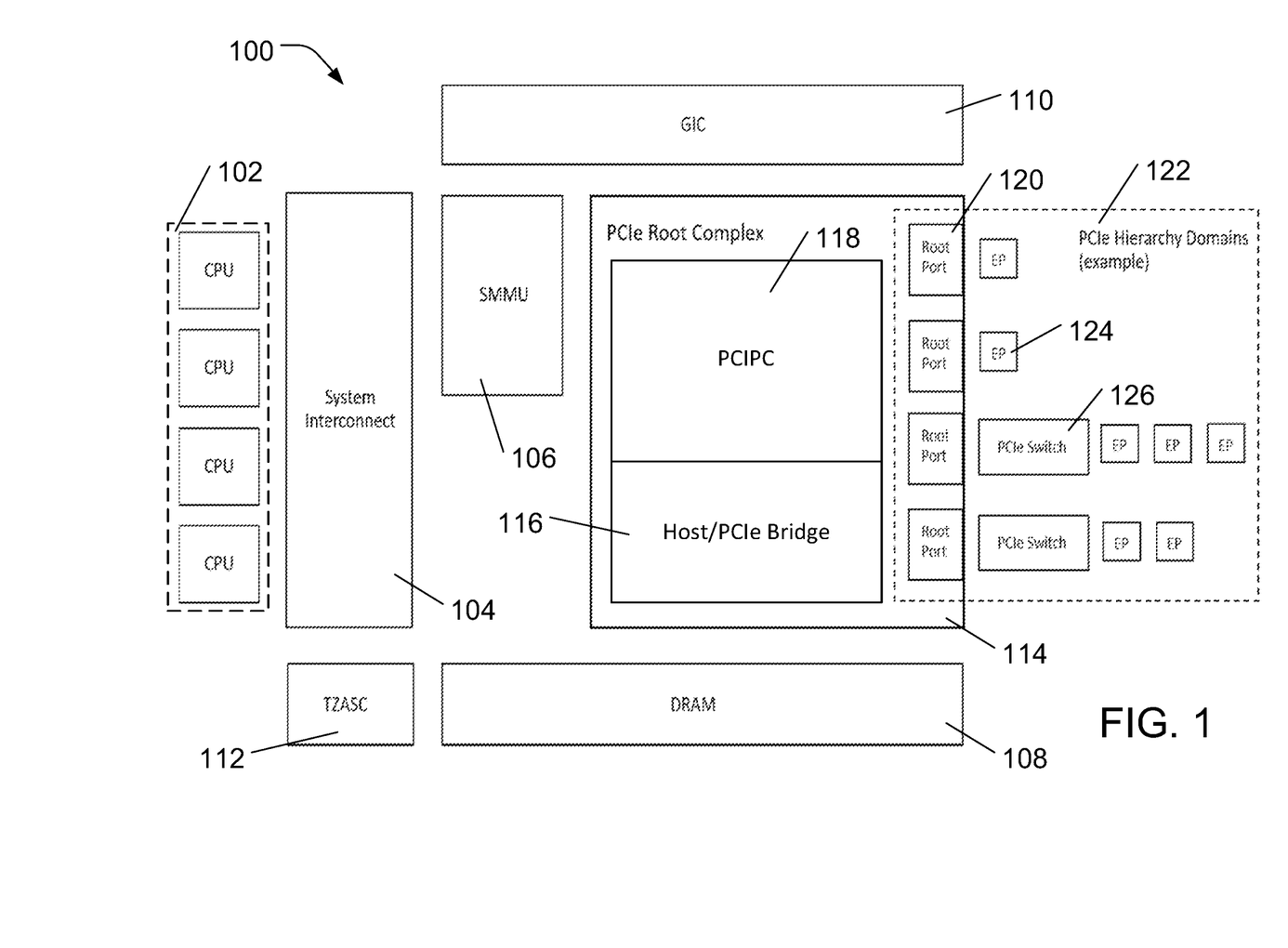
FIG. 1 shows a simplified component structure of a computer system with an attached PCIe subsystem including a PCIe protection controller in accordance with an implementation of the disclosed technology.

FIG. 1 shows a simplified component structure of an ARM-based computer system 100 with an attached PCIe subsystem including a PCIPC device in accordance with an implementation of the disclosed technology. The system 100 includes CPUs 102, a system interconnect 104, a system memory management unit (SMMU) 106, DRAM 108, and a generic interrupt controller (GIC) 110. Because the system 100 is shown as implementing the ARM TrustZone® technology, it further includes a TrustZone® Address Space Controller (TZASC) 112. Because the system 100 includes a PCIe subsystem, it includes a PCIe root complex 114. The PCIe root complex 114 includes a host/PCIe bridge 116, a PCIPC 118, and root ports 120. In the example shown in FIG. 1, the PCIe root ports 120 connect the system 100 to PCIe hierarchy domains 122, which include numerous endpoint devices (EPs) 124, as well as PCIe switches 126. It should be noted that in some implementations, PCIPC 118 can be viewed as coupled with or even as an extension of the host/PCIe bridge 116.

While many of these components, such as the CPUs 102, system interconnect 104, SMMU 106, DRAM 108, and GIC 110 are well-known in the art, further description of some of the components, such as the TZASC 112 and components of the PCIe root complex 114 may aid in an understanding of the disclosed technology. The TZASC 112 is part of the ARM TrustZone® hardware architecture. As is discussed above, ARM TrustZone® is a hardware security extension technology that provides a secure execution environment by splitting computer resources between a "normal world" and a "secure world." The TZASC 112 configures particular regions of memory (e.g., DRAM 108) as secure or nonsecure. Applications running in the secure world can access nonsecure memory regions associated with the normal world, but applications running in the normal world cannot access secure memory regions associated with the secure world. Partitioning the DRAM 108 into different memory regions and associating those regions with either the normal world or the secure world is performed by the TZASC 112 under the control of software running with secure world privileges.

The root complex 114 is a hardware system component that connects a PCIe switch and/or endpoint device tree to CPUs and system memory. The root complex includes a host bridge device (such as the host/PCIe bridge 116), one or more root ports 120, and may include integrated endpoint devices (not shown) and event collectors (not shown). In the system 100, the root complex 114 also includes a PCIPC 118 in accordance with the disclosed technology. The PCIPC 118 is used for runtime-programmable dynamic partitioning of the PCIe endpoint device space between a TEE and a REE. Thus, the PCIPC 118 is configured to protect secure PCIe endpoint devices against any nonsecure system components (including REE applications, any REE operating system, any REE hypervisor, and any nonsecure hardware peripherals). This function of the PCIPC 118 is referred to as outbound traffic control. Additionally, the PCIPC 118 is configured to protect secure system memory against nonsecure PCIe endpoint devices performing memory writes (including DMA and successful read request completions). This functions of the PCIPC 118 is referred to as inbound traffic control.

Figure 2:
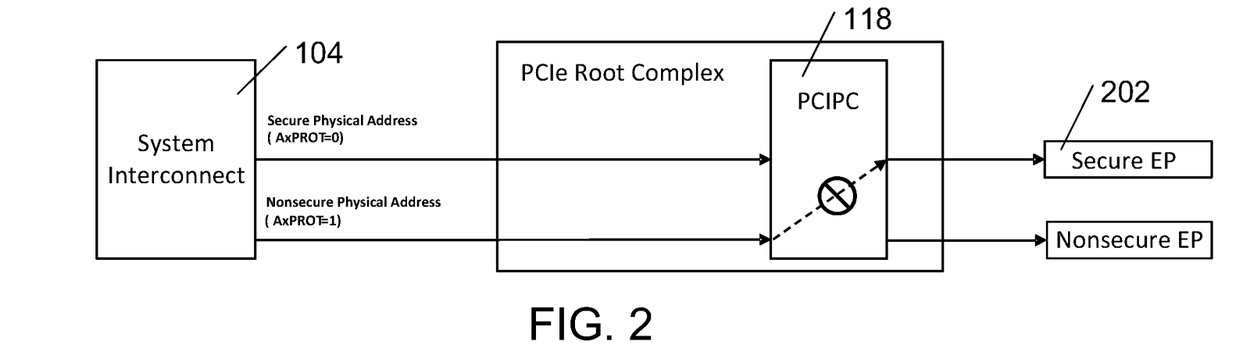
FIG. 2 is a block diagram illustrating the outbound traffic control functions of a PCIe protection controller in accordance with an implementation of the disclosed technology.

FIG. 2 shows a more detailed example of the outbound traffic control functions of the PCIPC 118. For outbound traffic control, the PCIPC 118 prevents nonsecure masters from accessing secure endpoint devices, while permitting such access to secure masters. Nonsecure masters include CPUs running in normal world as well as any nonsecure peripheral hardware. Such accesses are restricted to nonsecure physical memory space: system hardware ensures that a nonsecure master cannot issue a bus request addressed within the secure physical space.

As shown in FIG. 2, the PCIPC 118 will reject an access to a PCIe endpoint if both of the following are true:

(1) The transaction target address is submitted from nonsecure physical space. This implies that the request comes from a nonsecure master. Information about whether a transaction originated in secure or nonsecure physical space is available on the system interconnect 104. This may be achieved, for example, by using a bit (e.g., the AxPROT bit), which is set to "0" for a transaction that originated in a secure physical space, and "1" for a transaction that originated in a nonsecure physical space.

(2) The target address value falls into the memory range of an endpoint device designated as secure. Determining whether the target address belongs to a secure endpoint device is discussed in greater detail below.

FIG. 2 shows a request to a secure endpoint device 202 from a nonsecure physical space. Therefore, the PCIPC 118 will block the request from delivery to the target secure endpoint device 202. With respect to handling the requester, any of several strategies could be used, including, for example, triggering an exception, silently ignoring a write request, or returning a predefined (e.g. all bits set to "1") value as a result. It will be understood that the exact strategy is a design choice that will vary between implementations.

Figure 3:
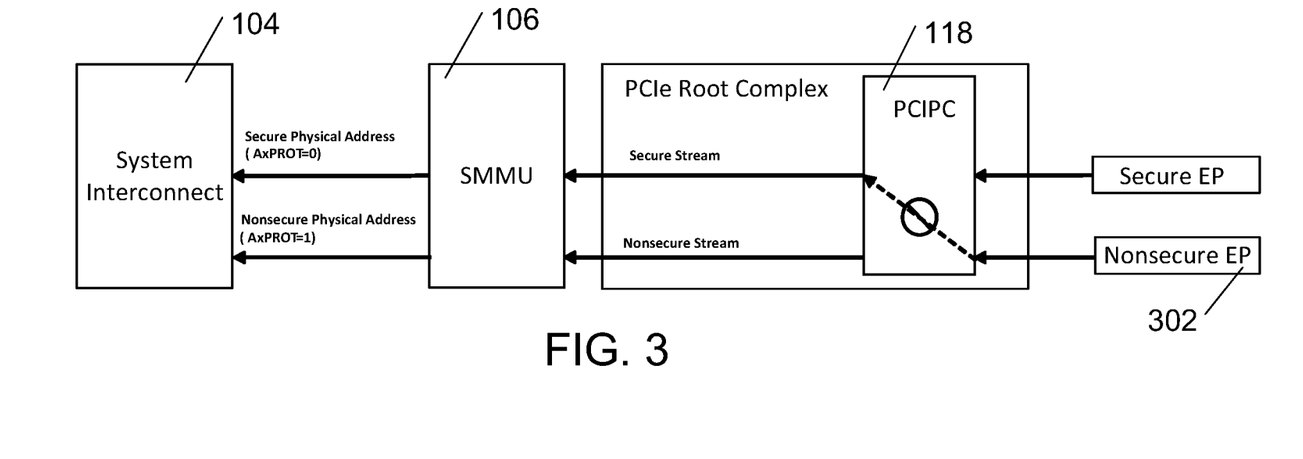
FIG. 3 is a block diagram illustrating the inbound traffic control functions of a PCIe protection controller in accordance with an implementation of the disclosed technology.

FIG. 3 shows a more detailed example of the inbound traffic control functions of the PCIPC 118. With inbound traffic control, the PCIPC 118 protects secure CPUs and peripherals against nonsecure PCIe endpoint devices. It should be noted that because PCIe endpoint devices exchange transactions with other components through system bus I/O (e.g. DMA, read request completions), this task may be reduced to preventing nonsecure PCIe endpoint devices from accessing secure system memory.

FIG. 3 shows a nonsecure PCIe endpoint device 302 attempting to request access to secure system memory. Because the request is coming from the nonsecure PCIe endpoint device 302, the PCIPC 118 effectively blocks the request by not translating the request to a secure stream or path. Note that the SMMU 106 maintains its job of address translation on both secure and nonsecure paths, which provides access control and isolation within both security domains. Determining whether an EP is secure is discussed in greater detail below. It will be understood that the SMMU 106 may also handle a wide variety of memory management tasks, the specifics of which may vary by system architecture. For example, the ARM SMMU mediates accesses to RAM by devices, and can translate addresses generated by DMA engines (i.e., software and/or controllers that handle DMA) to correct them as required, e.g., by the operating system. DMA is generally a method that allows devices and/or other hardware subsystems to access system memory directly, bypassing the CPU to speed up memory operations. Additionally, it will be understood that, as used throughout the present specification, "translate" is used in a broad sense, to indicate any kind of modification, transformation, or conversion.

Figure 4:
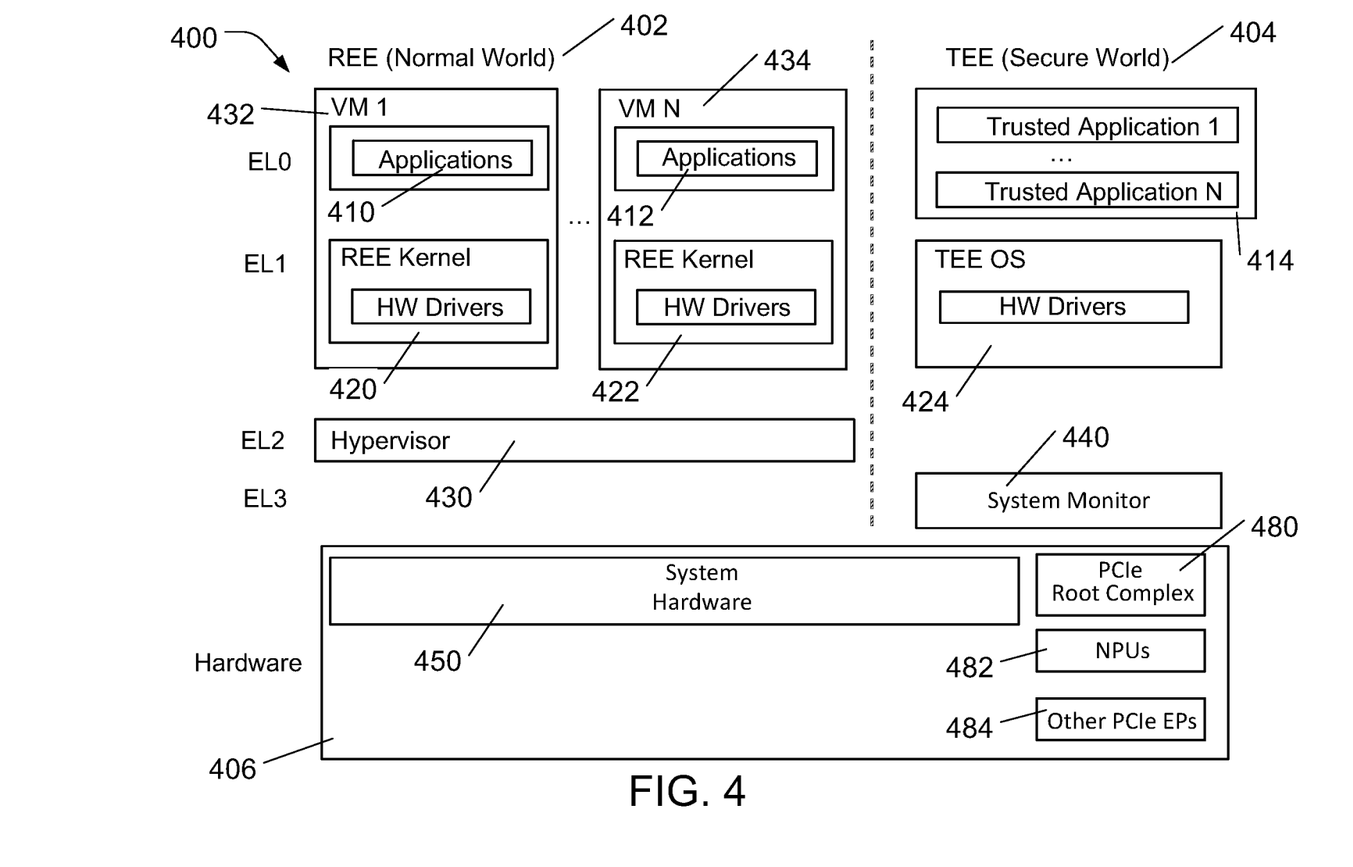
FIG. 4 shows a block diagram of an example server system environment in which the PCIe protection of the disclosed technology may be used.

Referring now to FIG. 4, an example server system environment 400 in which the PCIPC of the disclosed technology may be used is described. In the server system environment 400, the system is divided into a rich execution environment (REE) 402, operating in a normal world, and a trusted execution environment (TEE) 404, operating in a secure world. The server system environment 400 also includes four privilege levels, referred to as "exception levels" and denoted EL0-EL3. The server system environment 400 also includes hardware 406. The exception level EL0 is the least privileged exception level, and is generally used for applications, such as normal applications 410 and 412, and trusted applications 414. The EL1 level is more privileged than the EL0 level, and is typically used for operating systems, such as the REE kernels 420 and 422, and the TEE operating system 424. The EL2 is more privileged than the EL1 level, and is normally used by hypervisors, such as the hypervisor 430, on which virtual machines 432 and 434 execute. Generally, there is no EL2 in the secure world/TEE 404. The EL3 level is the most privileged exception level and is typically used for "secure monitor" functions 440, such as trusted firmware, secure monitor calls (SMCs), and interrupt handling. Such a "secure monitor" is generally responsible for switching between the secure world and the normal world. It should be noted that the EL3 level is only used in the secure world/TEE 404.

The hardware 406 includes the system hardware 450, including, for example, CPUs, a TZASC, a GIC, an MMU and SMMU, a DRAM, a cache, and a variety of other hardware devices. The hardware 406 also includes a PCIe root complex 480, that connects one or more NPU accelerator cards 482 as endpoint devices, as well as other endpoint devices 484. With some exceptions, such as a TZASC, which is accessed as a secure hardware device, most system hardware 450 may selectively operate in both the normal world and the secure world.

In general, the server system environment serves concurrent multi-user applications, hosts multiple tenant virtual machines, has highly configurable hardware options with respect to expansion cards and attached peripherals, and (at least in this implementation) supports ARM TrustZone® security extensions.

For purposes of providing context to the PCIPC technology as disclosed herein, assume that one or more of the tenants on the system have a task of confidential data processing using one or more of NPU accelerator cards 482. These NPU accelerator cards 482 are endpoint devices in the server's PCIe subsystem. In general, there will be multiple other PCIe endpoint devices 484 in the same PCIe domain. Furthermore, there will be multiple users or virtual machines contending for the pool of hardware devices. Also assume that the tenant's security requirements restrict data to the TEE. As such, the tenant's data processing application will have to ensure that, while the data are being processed, the NPU card is isolated from: (1) all nonsecure hardware peripherals; (2) all REE software, including operating system (OS) kernel and hypervisor (if present); and (3) all TEE users other than the tenant. Additionally, the following conditions may apply: (4) while the NPU accelerator cards 482 are in use by the tenants, all other PCIe devices should remain available to their respective users, including REE components as applicable; and (5) once the tenant terminates, completes the processing task, or once its time-shared lease on the NPU resources expires, the NPU accelerator card 482 may be made available to other users, which may mean nonsecure components, including REE software.

The PCIPC design described herein is a natural fit for items (1) and (2) above, while item (3) is addressed by traditional process isolation mechanisms within the TEE OS. Items (4) and (5) are directed to dynamic runtime partitioning of PCIe endpoint device space into secure and nonsecure devices, and will be discussed further below.

Figure 5:
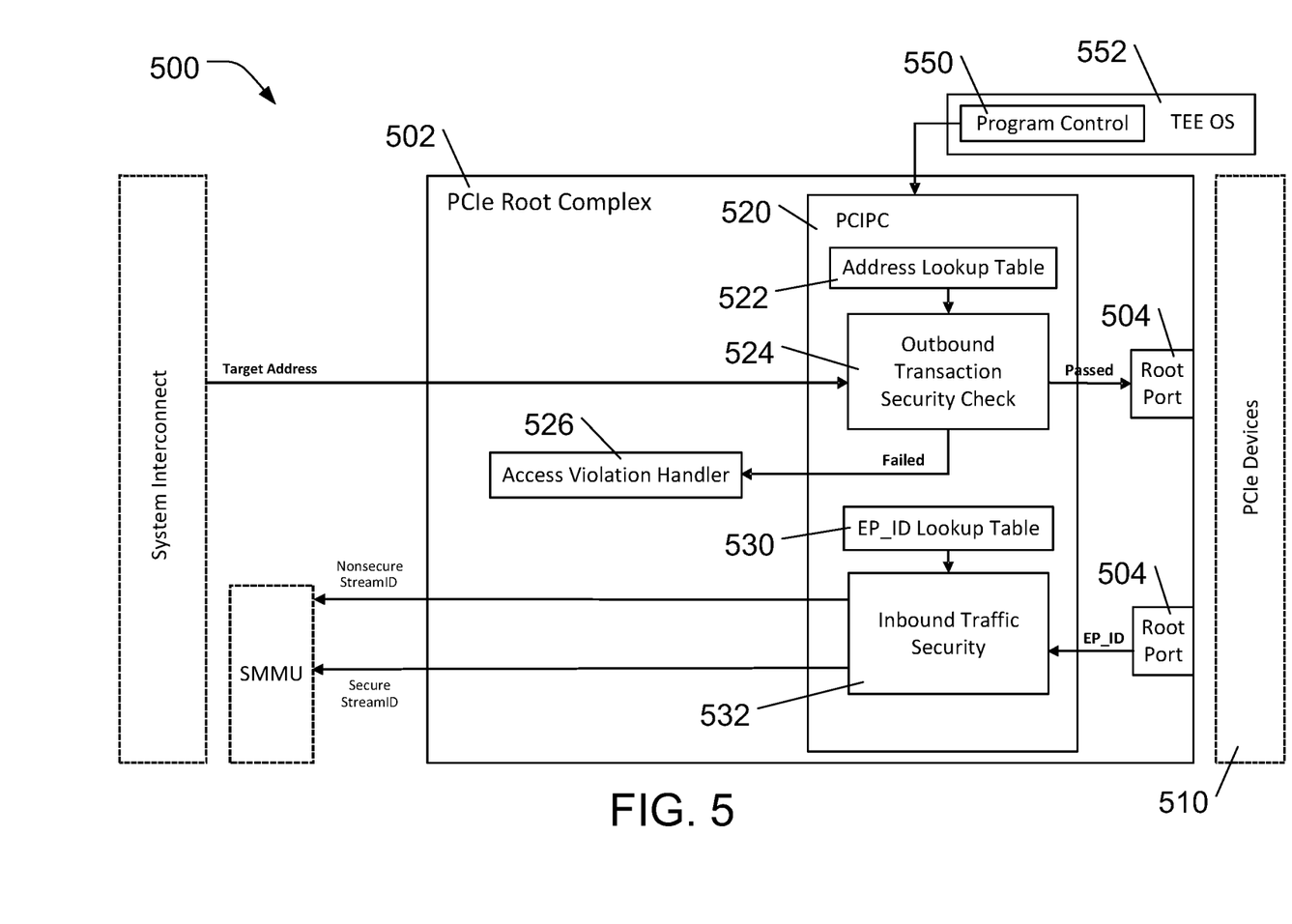
FIG. 5 shows a block diagram of portions of a system with a PCIe root complex that includes a PCIe protection controller in accordance with an implementation of the disclosed technology.

FIG. 5 shows system 500 including a PCIPC design in accordance with an implementation of the disclosed technology. The PCIe root complex 502 includes PCIPC 520, root ports 504, and an access violation handler 506. The root ports 504 connect the PCIe root complex 502 to PCIe devices 510, which may include, for example, NPU accelerator cards (not shown in FIG. 5), as discussed above.

For outbound traffic, the PCIPC 520 includes an address lookup table 522, which is used for determining whether the target address on an outbound path points to a secure endpoint device. The target address is a physical address pointing to either a memory-mapped I/O region or the configuration space for an endpoint device. For each secure endpoint device currently configured, the PCIPC 520 stores the base and the limit of memory-mapped regions for that device in the address lookup table 522. Thus, if the target address on the outbound path is found in the address lookup table, then the target address points to a secure endpoint device.

The PCIPC 520 also includes an outbound transaction security check module 524, that is described in greater detail below. If the outbound transaction security check passes, then the transaction is forwarded to the PCIe device for handling. Otherwise the event is reported to the access violation handler 506.

The access violation handler 506 prevents invalid requests from being forwarded to target endpoint devices. The specific behavior of access violation handler is a design choice, and several possible methods of handling outbound access violations could be implemented either statically or as a programmable configuration. For example, invalid read and/or write accesses could report faults or raise exceptions, invalid writes could be silently ignored, and/or invalid reads could result in a completion transaction returning a static predefined value, such as 0xff for each byte of the response.

For inbound traffic control, the PCIPC 520 of this implementation uses an EP_ID lookup table 530 to determine whether a transaction on the inbound path originated from a secure endpoint device. The mechanism for making this determination is based on the concept of PCIe endpoint device identity, EP_ID. In this implementation, the system starts with the PCIe transaction layer protocol (TLP) ID, which corresponds to Requester ID (during DMA transactions) or Completer ID (for TLP read completion). Both include bus, device and function (B/D/F) numbers of the endpoint device. This number uniquely identifies a PCIe device within a single PCIe hierarchy domain. To construct a unique PCIe device ID across all PCIe domains the system extends the B/D/F triple with the physical port index. The resulting value is referred to as the EP_ID. A possible construction algorithm for the EP_ID is as follows:

$$EP\_ID=(Port\_index<<16) \text{ OR } Requester\_ID$$

Where:
    << is a left bitwise shift operation; and
    OR is a bitwise OR operation (this uses the fact that Requester ID is a 16-bit value).

For secure endpoint devices, the PCIPC 520 will store the EP_ID in the EP_ID lookup table 530. This assignment of EP_ID numbers is performed during PCIe enumeration and is effectively a function of each PCIe-to-PCIe bridge configuration in a PCIe hierarchy. Unauthorized software (contextually, REE hypervisor and REE OS kernels) should be prevented from reprogramming any PCIe bridges in a way inconsistent with the stored bus information as was previously set by a trusted party (i.e., a TEE OS or EL3 Trusted Firmware).

To ensure B/D/F assignment consistency, the PCIe tree topology should be identical in a REE and TEE, which in turn is assured if the REE is prevented from making incompatible configuration changes to bridge configuration. Any PCIe bridge will have the same bus numbers (primary, secondary, subordinate) and memory ranges assigned to it as viewed from a REE and TEE. There will only be differences between REE and TEE views of the PCIe configuration space for secure endpoint devices.

Secure endpoint device configuration space will be read-only for normal world access. Thus, write access should be either silently ignored or result in an exception. Read access to endpoint device configuration space from normal world may return different values from those in secure world. This could be used, for example, to hide nonsecure functions on a secure endpoint device.

To ensure PCIe bridge configuration consistency, several steps could be taken. The TEE OS may be made responsible for the actual configuration. To minimize changes in REE kernels, write configuration from a REE should be allowed as usual. The enumeration algorithm in a REE kernel should be compatible with that in TEE/trusted firmware. A firmware call interface could be used from a REE instead of the standard PCIe enhanced configuration access mechanism (ECAM). The trusted firmware code could then detect a mismatch between the existing configuration and the write request and reject any requests for incompatible modification.

The PCIPC 520 also includes an inbound traffic security module 532, which is described in greater detail below. In general, the inbound traffic security module 532 maps memory access requests from nonsecure endpoint devices to a nonsecure stream ID, meaning that the SMMU will not permit access to secure system memory.

The PCIPC 520 may be controlled through a secure world program control module 550. The program control module 550 may, for example, be part of a TEE OS 552. For example, the program control module 550 may, for example, provide for dynamic runtime partitioning of the PCI endpoint device space into secure and nonsecure devices.

Such dynamic partitioning may be supported by programmatic control available via a PCIPC register space (not shown), which may be memory-mapped in secure address space to ensure that only TEE software, such as the program control module 550 can exercise this control. Dynamic partitioning may include the ability to designate a new endpoint device as secure by specifying its PCIe-side identity (e.g., by constructing an EP_ID, updating the EP_ID lookup table 530, and updating the address lookup table 522). Dynamic partitioning may further include the ability to remove the secure designation of an existing endpoint device (e.g., by updating the EP_ID lookup table 530 and the address lookup table 522), and/or the ability to query the existing configuration (e.g., by reading the EP_ID lookup table 530).

Optionally, the program control module 550 may also be able to configure the access policy violation handling policy for outbound transactions. This may be done, for example, by selecting a policy to be used by the access violation handler 506 from a number of predetermined policies. Alternatively, in some implementations, the program control module 550 could provide code or a pointer to code to the access violation handler 506 to define the policy violation handling policy.

Figure 6:
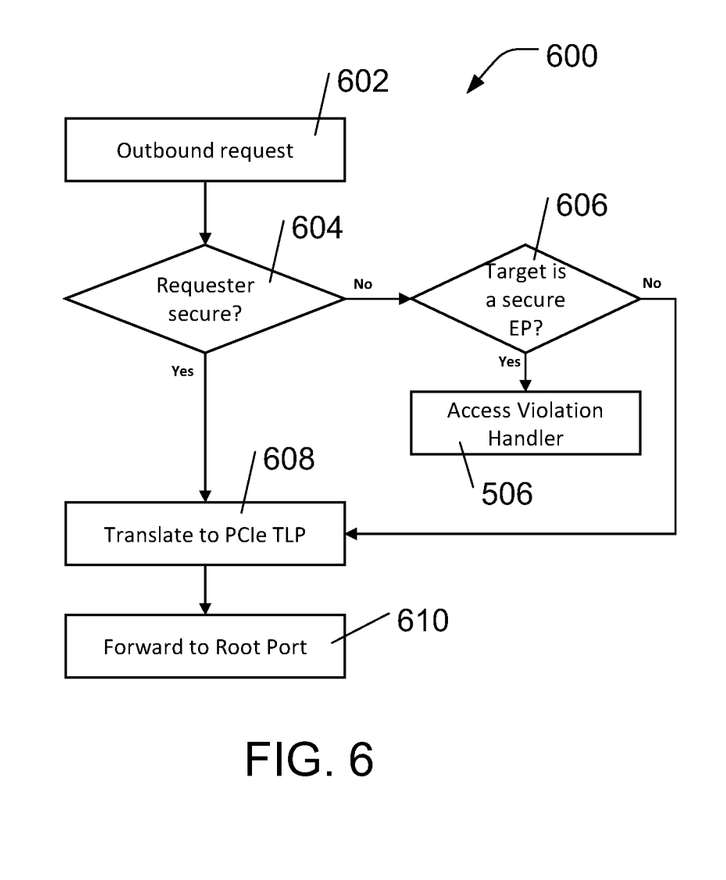
FIG. 6 is a flowchart showing the operation of an implementation of the outbound transaction security check module of the PCIe protection controller of FIG. 5.

FIG. 6 is a flowchart 600 showing the operation of an implementation of the outbound transaction security check module 524. As discussed above, the outbound transaction security check module 524 supports the protection of secure PCIe endpoint devices against nonsecure-mode CPUs and peripherals. Outbound traffic control applies to memory and configuration PCIe transaction types.

In block 602, an outbound request is received by the outbound transaction security check module 524. The request may be a memory PCIe transaction or a configuration PCIe transaction.

In block 604, the outbound transaction security check module 524 determines whether the requester is secure. In some implementations, this may be determined based on whether the request was made in the secure physical address space (meaning whether the requester is a secure master). If the requester is secure, then access to secure endpoint devices should be permitted, and the request is allowed through and forwarded to block 608. As discussed above with reference to FIG. 2, in some implementations, this determination may be made based on information available on the system interconnect 104, such as the AxPROT bit. It will be understood that the AxPROT bit referenced herein is specific to the ARM architecture, and that other architectures may use other bits, flags, signals, or other information that may be available through a system interconnect or similar component to indicate whether a requester is secure and/or whether a request was made in the secure physical address space.

If the requester was not secure, in block 606, the outbound transaction security check module 524 further checks whether the destination is a secure endpoint device. Since a nonsecure requester should not be able to access a secure endpoint device, if the destination is a secure endpoint device, then the request is reported to the access violation handler 506. If the destination was not a secure endpoint device, then even a nonsecure requester should be able to have access, so the request is allowed through, and forwarded to block 608.

In block 608, a successful request is translated into a PCIe transaction, and in block 610, the PCIe transaction is forwarded to the PCIe fabric (i.e., it is forwarded to a root port 504).

Figure 7:
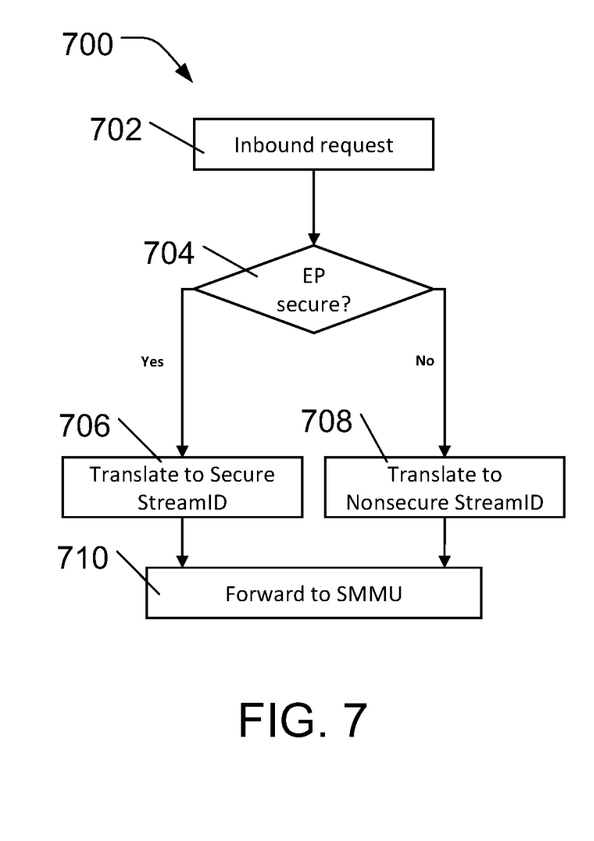
FIG. 7 is a flowchart showing the operation of an implementation of the inbound traffic security module of the PCIe protection controller of FIG. 5.

FIG. 7 is a flowchart 700 showing the operation of an implementation of the inbound traffic security module 532. The inbound traffic security module 532 supports protecting secure-mode CPUs and peripherals against nonsecure PCIe endpoint devices. Inbound traffic control applies to memory and configuration PCIe transaction types.

In block 702 an inbound request is received by the inbound traffic security module 532. The request may be a memory PCIe transaction or a configuration PCIe transaction.

In block 704, the inbound traffic security module 532 determines whether the originator of the incoming request is a secure endpoint device. As discussed above, this may be determined based on the EP_ID lookup table 530.

If the originator of the incoming request is a secure endpoint device, at block 706, the incoming request is translated to a secure StreamID. Otherwise, at block 708, the incoming request is translated to a nonsecure StreamID. A StreamID is an SMMU-level concept that acts as a selector for a per-device address translation table. By switching between secure and nonsecure paths, the PCIPC 520 ensures that transactions from secure endpoint devices are subject to secure translation, which can map to secure physical address space, while nonsecure transactions can only map to nonsecure physical space.

At block 710, the secure or nonsecure StreamID is forwarded to the SMMU.

Advantageously, the implementations described above with reference to FIGS. 5-7 provides a mechanism to designate arbitrary PCIe endpoint devices as either secure or nonsecure. Secure PCIe endpoint devices can be located at any position in PCIe hierarchy domains. This designation mechanism is secure, in that endpoint device assignments can only be performed under TEE software control. The designation mechanism is also dynamic, meaning that endpoint device security settings can be changed repeatedly at runtime.

These implementations also ensure that endpoint devices designated as secure are protected against unauthorized access by all untrusted components, including REE software and nonsecure peripherals. Read-only access to PCIe configuration space can be optionally enabled from a REE, subject to system designer choice and/or TEE-controlled policies. Enabling such access would allow secure endpoint devices to be fully discoverable by REE software while still protected in terms of memory-mapped I/O.

The implementations described with reference to FIGS. 5-7 also ensure that secure system components, including TEE memory and hardware peripherals, remain protected against access from PCIe endpoint devices currently designated as nonsecure.

It will be understood that implementations of the disclosed technology are not limited to the implementations described above with reference to FIGS. 5-7. Many changes or modifications could be made. For example, an implementation in which all securable endpoint devices either occupy a single root port, or are connected to a root port via a PCIe switch to form a subgroup whose security setting can only be changed as a set (i.e. any EPs attached to a single root port can either be all secure or nonsecure at the same time). While giving up some flexibility, this implementation is simplified in some of its aspects. For example, using such an implementation, the EP_ID may be constructed as just the root port index of the corresponding endpoint device. Additionally, it is not necessary in such implementations to keep consistency between the REE and TEE views of the PCIe trees (though for reasons of software system design, it still may be desirable to do so).

As with the implementation described with reference to FIGS. 5-7, this provides a mechanism to designate PCIe endpoint devices as either secure or nonsecure. There are two choices for the location of secure PCIe endpoint devices in PCIe domains: as a single endpoint device for a given root port; or as one of multiple endpoint devices for a given root port, with all endpoint devices on the root port sharing the same security settings. As with the previous implementation, this designation mechanism is secure and dynamic. Endpoint device assignments can only be performed under TEE software control, and endpoint device security settings can be changed repeatedly at runtime. Endpoint devices designated as secure are protected against unauthorized access by all untrusted components, including REE software and nonsecure peripherals. Read-only access to PCIe configuration space can be optionally enabled from a REE, subject to system designer choice and/or TEE-controlled policies. Enabling such access would allow secure endpoint devices to be fully discoverable by REE software while still protected in terms of memory-mapped I/O. Additionally, like the implementation described with reference to FIGS. 5-7, in this implementation, secure system components, including TEE memory and hardware peripherals, remain protected against access from PCIe endpoint devices currently designated as nonsecure.

Compared to the implementation described with reference to FIGS. 5-7, the hardware design for PCIPC is simpler in the modified implementation, with the likely benefits of reduced hardware costs, chip real estate and power consumption. Additionally, the security model is not predicated on the consistency of B/D/F allocation between TEE and REE views, with the possible benefits of more relaxed system software support requirements and a more robust security model.

While the implementations discussed above use NPU applications as examples, it will be understood that the underlying technology is applicable in other potential scenarios where PCIe is used as the main system interface. For example, the disclosed technology could be used in secure storage applications. Several options exist for secure storage, irrespective of the underlying device interface (e.g. SATA, SCSI, SAS, PCIe). Up to now, however, all solutions have had to assume that the underlying block I/O layer was not immune to root-level attacks. A secure interface such as the disclosed secure PCIe technology may provide new design options or provide addition security advantages over existing solutions.

Additionally, the disclosed technology could be used in secure networking applications. Networking stacks are typically comprised of multiple layers (e.g., the seven layers of the well-known OSI model), of which at least one (and potentially several) provides data security. Highly sensitive applications, however, may benefit from protection at a lower level (e.g. to combat side channel attacks), particularly if such protection is effective against root-level REE attacks. This protection is not present in common networking stack implementations but may be implemented using the disclosed technology.

As another example application, the disclosed technology could be used in secure high-performance cluster computing. PCIe could be used to build a cluster interconnect between multiple computers. The hardware-based security of various implementations of the disclosed technology could be used to reduce the possibilities for attacks in such a cluster computing system.

It will be understood that, although the embodiments presented herein have been described with reference to specific features and structures, various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:
1. A computer system comprising:
at least one central processing unit (CPU);
a TrustZone® Address Space Controller (TZASC) configured to distinguish between secure and nonsecure entities;
a memory device partitioned into a secure memory region and a nonsecure memory region, in accordance with TZASC determinations;
a PCIe root complex subsystem incorporating at least one root port and a PCIe bridge with an integrated PCIe protection controller (PCIPC), each root port being configured to optionally connect to a PCIe endpoint device, the PCIe root complex subsystem configured to:
designate dynamically at runtime the PCIe endpoint device as being a secure endpoint device or as a nonsecure endpoint device; and
determine whether an outbound request originates from a secure component of the computer system or from a nonsecure component of the computer system;
a system interconnect connecting the at least one central processing unit, the memory device, and the PCIe root complex subsystem; and
a system memory management unit configured to translate addresses for direct memory access (DMA) requests from the PCIe endpoint device before the requests are passed into the system interconnect;
the PCIe protection controller is configured to:
forward the outbound request to the PCIe endpoint device if the outbound request originates from the secure component of the computer system;

forward the outbound request to the PCIe endpoint device if the outbound request originates from the nonsecure component of the computer system and the PCIe endpoint device is designated as the nonsecure endpoint device; and report the outbound request to an access violation handler if the outbound request originates from the nonsecure component of the computer system and the PCIe endpoint device is designated as the secure endpoint device.

2. The computer system of claim 1, wherein the PCIe protection controller is configured to control the outbound traffic to protect the secure endpoint devices by:

allowing a request from a secure component of the computer system;

allowing the request from a nonsecure component of the computer system if a destination of the request is a nonsecure endpoint device; and reporting the request to an access violation handler if the request is not allowed.

3. The computer system of claim 2, wherein the PCIe protection controller is configured to use information from the system interconnect to determine whether the request originates from the secure component of the computer system.

4. The computer system of claim 2, wherein the PCIe protection controller comprises an address lookup table that stores address ranges for memory-mapped regions of each secure endpoint device.

5. The computer system of claim 4, wherein the PCIe protection controller is configured to use information from the address lookup table to determine whether a destination of the request is the nonsecure endpoint device.

6. The computer system of claim 2, wherein the access violation handler is configured to trigger an exception for a request that is not allowed.

7. The computer system of claim 2, wherein the access violation handler is configured to ignore a write request that is not allowed.

8. The computer system of claim 2, wherein the access violation handler is configured to return a predetermined value for a read request that is not allowed.

9. The computer system of claim 2, wherein the PCIe protection controller is configured to dynamically set an access violation policy of the access violation handler unit.

10. The computer system of claim 1, wherein the PCIe protection controller is configured to control the inbound traffic to protect the secure memory region by preventing access thereto by nonsecure endpoint devices by:

determining whether an originator of an incoming request is the secure endpoint device;

translating the incoming request to a secure StreamID and forwarding the secure StreamID to the system memory management unit if the originator of the incoming request is the secure endpoint device; and translating the incoming request to a nonsecure StreamID and forwarding the nonsecure StreamID to the system memory management unit if the originator of the incoming request is the nonsecure endpoint device.

11. The computer system of claim 10, wherein the PCIe protection controller further comprises an EP_ID lookup table that stores an endpoint device identity for each secure endpoint device.

12. The computer system of claim 11, wherein the PCIe protection controller is configured to determine whether the originator of the incoming request is a secure endpoint device based, at least in part, on information from the EP_ID lookup table.

13. The computer system of claim 11, wherein the endpoint device identity is based, at least in part, on bus, device, and function numbers of the endpoint device.

14. The computer system of claim 13, wherein the endpoint device identity is further based on a physical port index.

15. The computer system of claim 14, wherein the bus, device, and function numbers are encoded in a requester ID value, and wherein the endpoint device identity is computed using bitwise operations to combine the requester ID value with the physical port index.

16. The computer system of claim 1, wherein the PCIe protection controller is further configured to query a security configuration of the PCIe endpoint device.

17. The computer system of claim 1, wherein the PCIe protection controller comprises a register space that is memory-mapped to a secure address space, and wherein the PCIe protection controller is dynamically configurable at runtime by accessing the register space.

18. A method of controlling outbound data traffic from a computer system to a PCIe endpoint device, the computer system incorporating a TrustZone® Address Space Controller (TZASC), a PCIe root complex subsystem incorporating at least one root port, and a PCIe bridge with an integrated PCIe protection controller, the method comprising:

designating dynamically at runtime, by the PCIe root complex subsystem, the PCIe endpoint device as being a secure endpoint device or as a nonsecure endpoint device;

determining, by the PCIe root complex subsystem, whether an outbound request originates from a secure component of the computer system or from a nonsecure component of the computer system;

forwarding, by the PCIe protection controller, the outbound request to the PCIe endpoint device if the outbound request originates from the secure component of the computer system;

forwarding, by the PCIe protection controller, the outbound request to the PCIe endpoint device if the outbound request originates from the nonsecure component of the computer system and the PCIe endpoint device is designated as the nonsecure endpoint device; and reporting, by the PCIe protection controller, the outbound request to an access violation handler if the outbound request originates from the nonsecure component of the computer system and the PCIe endpoint device is designated as the secure endpoint device.

19. A method of controlling inbound data traffic from a PCIe endpoint device to a computer system, the computer system incorporating a TrustZone® Address Space Controller (TZASC), a PCIe root complex subsystem incorporating at least one root port, and a PCIe bridge with an integrated PCIe protection controller, the method comprising:

designating dynamically at runtime, by the PCIe root complex subsystem, the PCIe endpoint device as being a secure endpoint device or as a nonsecure endpoint device;

determining, by the PCIe root complex subsystem, whether an originator of an incoming request is the secure endpoint device or the nonsecure endpoint device;

translating, by the PCIe root complex subsystem, the incoming request to a secure StreamID and forwarding the secure StreamID to a system memory management unit if the originator of the incoming request is the secure endpoint device; and translating, by the PCIe root complex subsystem, the incoming request to a nonsecure StreamID and forwarding the nonsecure StreamID to the system memory management unit if the originator of the incoming request is the nonsecure endpoint device.

\* \* \* \* \*